DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 8

T917,003

PHOTOGRAPHIC PROCESS AND PRODUCT

Charles A. Goffe, Robert D. Lindholm, and Peter M. Stacy, all % Eastman Kodak Company, Rochester, N.Y. 14650

Filed Sept. 28, 1972, Ser. No. 293,289

Int. Cl. G03c *5/24, 5/26, 1/76*

U.S. Cl. 96—48 RP

No Drawing. 9 Pages Specification

An element comprising a halogen acceptor coated on a transparent support contacted with a second element comprising a print-out photographic emulsion on a separate support provides an improved print-out photographic product. An improved print-out photographic process is provided by imagewise exposing the product to light and separating the two elements. A stable, visible image results without the need of a subsequent photo-development or heat stabilization step.